United States Patent
Menzel

(10) Patent No.: US 8,540,803 B2
(45) Date of Patent: Sep. 24, 2013

(54) METHOD AND DEVICE FOR REMOVING WATER FROM NATURAL GAS OR FROM INDUSTRIAL GASES WITH PHYSICAL SOLVENTS

(75) Inventor: Johannes Menzel, Waltrop (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 0 days.

(21) Appl. No.: 13/498,026

(22) PCT Filed: Sep. 22, 2010

(86) PCT No.: PCT/EP2010/005789
§ 371 (c)(1),
(2), (4) Date: Apr. 6, 2012

(87) PCT Pub. No.: WO2011/035896
PCT Pub. Date: Mar. 31, 2011

(65) Prior Publication Data
US 2012/0279394 A1    Nov. 8, 2012

(30) Foreign Application Priority Data
Sep. 23, 2009    (DE) .................. 10 2009 042 365

(51) Int. Cl.
*B01D 53/14* (2006.01)

(52) U.S. Cl.
USPC ............. 95/173; 95/174; 95/176; 95/183; 95/192; 95/193; 95/199; 95/208; 95/209; 95/223; 95/231; 95/236; 96/234; 96/242

(58) Field of Classification Search
USPC ............. 95/199, 223, 231, 178, 179, 181, 95/183
See application file for complete search history.

(56) References Cited

U.S. PATENT DOCUMENTS 4,302,220 A * 11/1981 Volkamer et al. ............... 95/166
4,498,911 A    2/1985 Deal et al.
(Continued)

FOREIGN PATENT DOCUMENTS

DE    19945326 B4 *    3/2008
DE    199945326 B4    3/2008
(Continued)

OTHER PUBLICATIONS

International Search Report for PCT/EP2010/005789, Completed by the European Patent Office on Jan. 25, 2011, 2 Pages.

*Primary Examiner* — Duane Smith
*Assistant Examiner* — Phillip Shao
(74) *Attorney, Agent, or Firm* — Brooks Kushman P.C.

(57) ABSTRACT

A method and apparatus for drying a natural gas or an industrial gas that contains acidic gas components, wherein gas drying is followed by the removal of the acidic gas components from the dried gas. The same physical solvent is used for both of the process steps of gas drying and of acidic gas removal. The gas to be dried is brought into contact with the physical solvent, which absorbs most of the water contained in the gas. The physical solvent, loaded with water, is transferred into a solvent regenerating device to be heated where the water contained in the solvent is stripped from the solvent in the countercurrent by acidic gas that is removed from the dried useful gas during the acidic gas absorption. The acidic gas being released again in the acidic gas solvent regenerating device, stripped from the solvent, and discharged from the solvent regenerating device.

20 Claims, 1 Drawing Sheet

(56) References Cited

U.S. PATENT DOCUMENTS

| | | | |
|---|---|---|---|
| 4,578,094 A * | 3/1986 | Mehra | 62/635 |
| 4,979,966 A | 12/1990 | Rojey et al. | |
| 6,299,671 B1 | 10/2001 | Christensen | |
| 6,342,091 B1 * | 1/2002 | Menzel et al. | 95/167 |
| 6,645,272 B2 * | 11/2003 | Lemaire et al. | 95/174 |
| 2004/0115109 A1 | 6/2004 | Minkkinen et al. | |
| 2009/0199712 A1 | 8/2009 | Menzel et al. | |

FOREIGN PATENT DOCUMENTS

| | | |
|---|---|---|
| EP | 0020967 A1 | 1/1981 |
| WO | 9411090 A1 | 5/1994 |
| WO | 2007000217 A2 | 1/2007 |

* cited by examiner

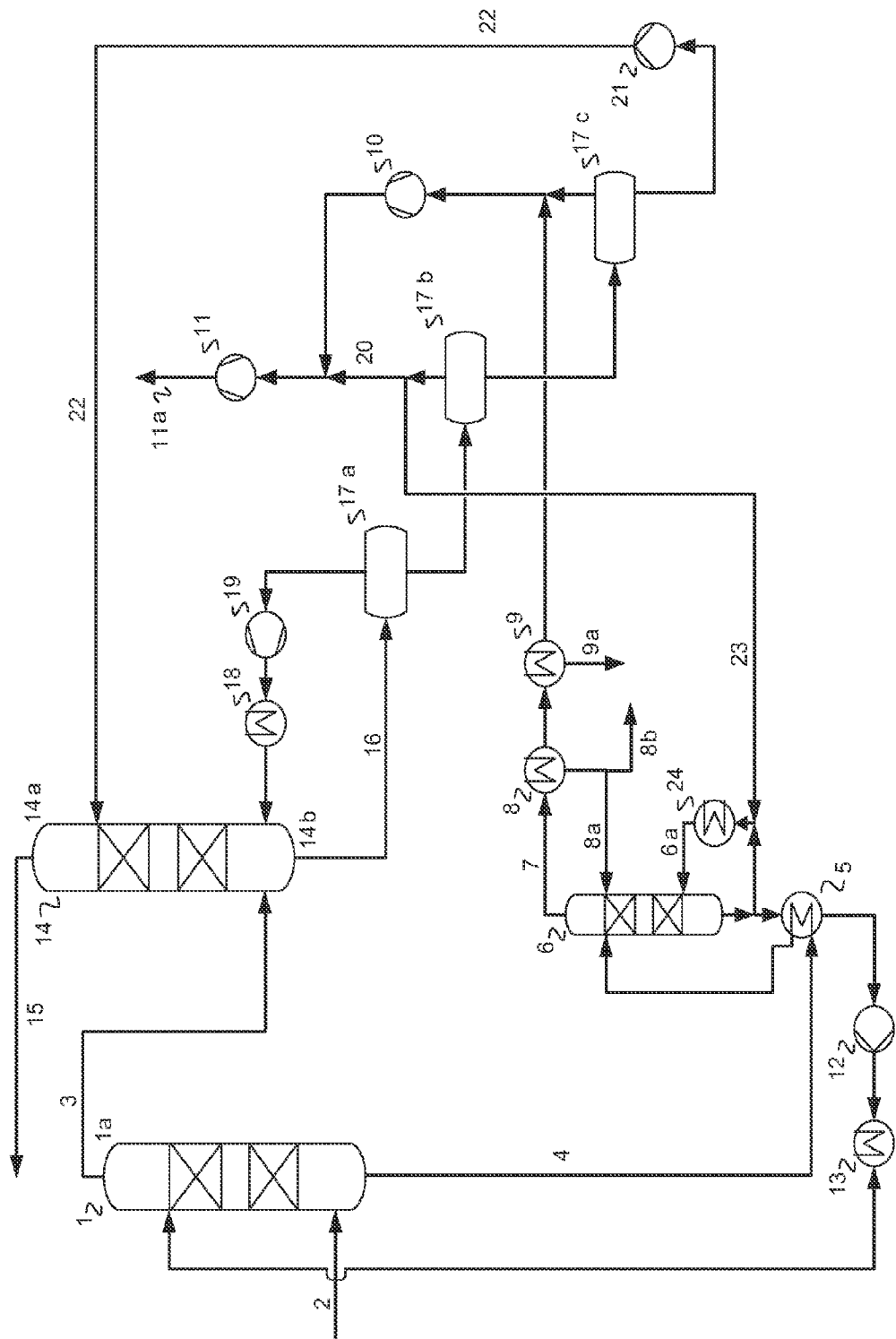

METHOD AND DEVICE FOR REMOVING WATER FROM NATURAL GAS OR FROM INDUSTRIAL GASES WITH PHYSICAL SOLVENTS

CROSS-REFERENCE TO RELATED APPLICATION

This application is the U.S. national phase of PCT Appln. No. PCT/EP2010/005789 filed Sep. 22, 2010, which claims priority to German application 10 2009 042 365.6 filed on Sep. 23, 2009, the disclosures of which are incorporated in their entirety by reference herein.

The invention relates to a process for the removal of water from natural or industrial gases using physical solvents, the gas being freed both from water and entrained acid gases and the treated industrial gas having a considerably reduced water content such that further drying of the industrial gas prior to subsequent use is not required. The invention also relates to a unit as a contrivance with the aid of which this process can be run, said contrivance consisting of at least two absorption columns and one regeneration column, or contrivances of similar type, and related solvent separators.

Natural gas must be dried before being made available as, if supplied to the pipeline system without drying, this would lead to corrosion of the latter. It must also be ensured that the removal of water does not cause ice formation at low ambient conditions. Glycol compounds are frequently used as absorbents for the removal of water, acid gases contained in the natural gas being partly co-absorbed such that, after the absorption, a water-containing solvent laden with acid gases is obtained.

For the absorption of acid gases from natural gases or industrial gases it is of advantage to dry the feed gas before feeding it to the acid gas scrubber because otherwise the water from the feed gas would increase the water content in the solvent and the acid gas absorption capacity of a solvent laden with water is lower. The required water removal from the feed gas may, for example, be carried out by an upstream drying process using a water-absorbing absorbent as, for instance, a glycol compound or a molecular sieve.

U.S. Pat. No. 6,299,671 B1 describes a process for the regeneration of water-containing triethylene glycol which is used as a solvent for the absorption of water and acid gases from industrial gases and which, for regeneration, is first fed to a regeneration column, gas and water being withdrawn at the column head and the regenerated solvent being able to be fed to a stripping column for further regeneration, stripping gas being fed to the regeneration column and fed in counter-current to the solvent to be regenerated such that the drying process is considerably intensified, the gas used as stripping gas being the gas withdrawn from the column head in the regeneration of the solvent. However, the process can only be used if the gas to be treated does not contain larger amounts of acid gas.

WO 2007/000217 A2 describes a process for the absorption of pressurised natural gases containing acid gases using physically active absorbents, the natural gas first being fed to an absorption column and part of the laden scrubbing agent being fed to a solvent separator with an absorption column directly mounted on top in which a stripping gas poor in acid gas and a laden solvent are obtained, and the laden solvent being fed to a further solvent separator and a stripping column, and the stripping column being passed by the stripping gas poor in acid gas such that a regenerated solvent is obtained which is divided into two part-streams, the first part-stream being fed to the first absorption column and the second part-stream being fed to the absorption column directly mounted on top and the acid gas being obtained from the second separator and the treated natural gas being obtained from the first separator. The process can only be used if the water content of the natural gas to be treated is reduced to such a degree that a strong enrichment of water in the solvent is avoided.

With regard to an entire plant it would be of advantage if the solvent used for the removal of acid gases was also used for the upstream drying of the gas. Thus, no additional auxiliary facilities, such as storage tanks, collecting vessels or other devices, are required.

Most physical solvents used as absorbers for the removal of acid gases are susceptible to decomposition as occurring at temperatures around 200° C. in the regeneration of glycols. Therefore, it would be particularly advantageous to carry out the regeneration of the physical solvent used in the drying process such that regeneration takes place at considerably lower temperatures of up to 150° C.

According to the invention this is achieved by passing the gas to be treated first through an absorption column in which this gas is brought into contact with a physical solvent, and in which the water contained in the gas to be treated and part of the acid gas are absorbed and the solvent leaving the absorber at the bottom and enriched with both water and acid gas is conveyed to a solvent regeneration unit, and the gas freed from water and partly from acid gases is conveyed to a second downstream absorption column provided for the actual removal of acid gases, where a completely or almost completely purified gas and a solvent laden with the remaining acid gases is obtained. According to the invention the solvent obtained there and laden with the remaining acid gases is flashed in an acid gas solvent regeneration unit, a purified solvent being obtained, and an acid gas inventively divided into two part-streams, the first part-stream of the acid gas being discharged or passed to external applications and the second part-stream conveyed to the solvent regeneration unit or to the reboiler bottom of the solvent regeneration unit.

The acid gas part-stream fed to the reboiler bottom passes the regeneration column in counter-current to the solvent enriched with water. The solvent to be regenerated is—in accordance with the requirements of the related gas drying—almost free of water and then returned to the first absorption column provided for drying. Here, use is made of the property of physical solvents that the absorption capacity of water is normally larger than that of acid gases. Additional stripping with acid gas allows to carry out the regeneration process in the regeneration column at temperatures of below 150° C.

Therefore, the invention particularly claims a process for the removal of water or water vapour from industrial gases by absorption using a physical solvent, wherein the industrial gas contains vaporous water and acid gas components, and the industrial gas to be dried and containing acid gas and water is brought into contact with the physical solvent, yielding an industrial gas almost free of water and containing acid gas as well as a water-containing solvent stream, and the water-containing solvent stream thereby obtained is fed to a solvent regeneration unit, yielding a solvent of reduced water content, which is then returned for the absorption of the water from the industrial gas and again brought into contact with the industrial gas, and the industrial gas stream dried after the absorption of the water from the industrial gas is conveyed to a downstream acid gas removal unit, using the same solvent already employed in the gas drying for the removal of the acid gases, and an industrial gas almost free of acid gas components and an acid gas-containing solvent are obtained, and the solvent laden with acid gas components is conveyed to an acid gas solvent regeneration unit in which a regenerated solvent and the acid gas removed from the solution are obtained, characterised in that the acid gas stream obtained in the acid gas solvent regeneration unit is divided into two part-streams, the first part-stream being passed to further use or disposed of, and the second acid gas part-stream being fed to the solvent regeneration unit related to the drying process in which the water enriched in the solvent is removed from the solvent with the aid of the second acid gas part-stream, the removed water leaving the solvent regeneration unit as water vapour together with the acid gas.

The absorbing solvent is preferably brought into contact with the industrial gas to be purified in an absorption column. The solvent regeneration unit is preferably a regeneration column which can be equipped with a reboiler. The acid gas removal unit is also preferably an absorption column. The acid gas solvent regeneration unit preferably consists of one or several flash vessels. The second acid gas part-stream can be fed to the solvent regeneration unit at any point. In an exemplary mode this stream can be fed to the reboiler of the solvent regeneration unit.

The solvent regeneration unit can be operated in such as way that the second acid gas part-stream from the acid gas solvent regeneration unit is conveyed to the bottom of the solvent regeneration unit, the acid gas fed to the bottom of the solvent regeneration unit removing the water contained in the solvent and originating from the solvent flowing down in counter-current, and the removed water leaving the head of the solvent regeneration unit as water vapour together with the acid gas.

The solvent regeneration unit can also be operated in such a way that the second acid gas part-stream is fed to the bottom of the reboiler related to the solvent regeneration unit, the acid gas fed to the reboiler bottom removing the water contained in the solvent, and the removed water being fed to the bottom of the solvent regeneration unit as water vapour together with the acid gas, and there also removing the water from the solvent stream flowing down in counter-current as water vapour together with the acid gas.

Examples of acid gas components very frequently absorbed in the inventive process are hydrogen sulphide ($H_2S$), carbon dioxide ($CO_2$), carbon oxide sulphide (COS), mercaptans or a mixture of these gases. When passing through the acid gas in counter-current the water is completely or almost free of the solvent. The water discharged from the head of the regeneration column contains major portions of acid gas. In an advantageous embodiment the water removed from the solvent and leaving the head of the regeneration column as water vapour together with the acid gas components is condensed. The recovered condensate which mainly consists of water is returned to the head of the regeneration column. A part-stream of the recovered condensate can be withdrawn, discharged from the process and disposed of. Any solvent portions still contained in the head vapours are backwashed by means of the condensate stream such that the acid gas vapour leaving the head condenser of the regeneration column is almost free of solvent.

In another advantageous embodiment of the invention, the acid gas which leaves the head of the regeneration column and is almost free of solvent is cooled further in such as way that the remaining entrained water vapour condenses and the water contained in the acid gas can completely be withdrawn from the process and disposed of.

The acid gas stream leaving the regeneration column of the gas drying unit can be combined with the acid gas stream from the acid gas removal unit after condensation and separation of the condensate. Alternatively the acid gas stream leaving the head of the regeneration column of the gas drying unit can also be combined with the acid gas stream from the acid gas removal unit after separation of the condensate and separation of the water. This is particularly of advantage if the acid gas must or should not be emitted. Examples of undesired emission gases are sulphur components, such as hydrogen sulphide ($H_2S$), carbon oxide sulphide (COS) and mercaptans.

As the water is removed from the solvent by the additional stripping effect of the acid gas, it is advantageously possible to remove the water from the solvent in a temperature range between 50 and 180° C., preheating being performed by a preheater or a reboiler. In a particularly advantageous embodiment the water is removed from the physical solvent at a temperature between 100 and 140° C.

In another embodiment of the invention the solvent which leaves the regeneration column of the drying unit and is almost free of water is cooled by means of a cooler or heat exchanger prior to being brought into contact again with the gas to be purified. If the acid gas leaving the drying unit is to be combined with the acid gas bulk leaving the acid gas removal unit for further processing, the acid gas used for stripping in the regeneration column will either be compressed by means of a compressor or a blower to a slightly higher pressure or an acid gas stream obtained at a higher pressure level will be branched off the acid gas solvent regeneration unit. Thus, it is possible to dispose of any acid gases including those obtained from drying or to avoid that acid gases are emitted into the atmosphere.

The physical solvent used for the removal of water is typically a solvent as commonly used in the state of the art. An embodiment of the inventive process uses N-formyl morpholine or mixtures of N-formyl morpholine with morpholine derivatives. In another embodiment of the process the physical solvent is propylene carbonate. In another embodiment of the process the physical solvent is alkylated polyalkylene glycols.

The industrial gas to be purified is preferably natural gas. The industrial gases to be purified can also, for example, be refinery gases, coke oven gases or gases used in chemical industry.

The pressure of the inventive process can be adjusted as desired. For example, a pressure between 50 and 100 bar is set in the first absorption column. In the solvent regeneration unit a pressure between, for example, 0 and 10 bar is set. A pressure between 0.5 and 5 bar is preferably adjusted in the solvent regeneration unit. In the solvent regeneration unit the acid gas, for example, has a pressure between 3 and 1 bar.

The invention also claims a contrivance for the removal of water or water vapour from industrial gases by absorption using a physical solvent, the inventive contrivance consisting of at least one absorption column for gas drying, at least one solvent regeneration unit for the water-containing solvent leaving the absorption column of the gas drying unit, at least one more absorption column for the dried and acid gas-containing industrial gas, at least one acid gas solvent regeneration unit, and which is characterised in that
- the solvent bottom stream of the absorption column intended for gas drying can be routed to the head of the solvent regeneration unit, and
- the solvent bottom stream of the solvent regeneration unit can be routed back to the first absorption column intended for gas drying after the removal of water, and
- the dried gas can be fed to the acid gas removal unit which removes major part of the acid gas components contained in the feed gas by means of a regenerated solvent stream, and the solvent leaving the bottom of the acid gas removal unit and laden with acid gases can be fed to an acid gas solvent regeneration unit, and a part-stream of the acid gas recovered in the acid gas solvent regeneration unit can be routed to the bottom of the solvent regeneration unit related to the absorption column or to the bottom of the related reboiler, and
- the head gas stream of the solvent regeneration unit can be mixed with an acid gas stream from the acid gas solvent regeneration unit or is discharged.

The solvent regeneration unit can be equipped with a reboiler. The solvent regeneration unit is preferably a regeneration column. The regeneration unit of the acid gas removal unit (acid gas solvent regeneration unit) preferably consists of one or several flash vessels. The acid gas removal unit is preferably an absorption column. In another embodiment of the invention the contrivance for the removal of water or water vapour from industrial gases in the connecting line between the acid gas stream from the acid gas solvent regeneration unit of the acid gas removal unit and the regeneration column of the drying unit is equipped with a compressor or a blower used to compensate the pressure drop by means of the acid gas solvent regeneration unit.

The inventive contrivance is equipped with absorption columns which facilitate gas scrubbing in contact with an acid gas-absorbing solvent. The absorption column can be of any type and is preferably equipped with trays or packings allowing mass transfer. The packings can be Pall rings, Raschig rings, structured packings or saddle packings. The flash vessels as well can be of any desired type. The inventive contrivance also includes compressors, pumps, valves, piping, control elements, filters and measuring units depending on the specific requirements. The inventive contrivance also includes reboilers, heaters or coolers. The inventive contrivance also includes liquid separators for separating liquids from the gas phase and which may be provided in any number.

The inventive process has the advantage to be an efficient drying process used for industrial gases and fuel gases and operated with an acid gas-absorbing solvent, the absorbent used for the removal of acid gases also being used for gas drying. The regeneration of the solvent can advantageously be carried out in the solvent regeneration unit at temperatures of below 150° C. such that conventional solvents do not decompose. The removal of water can be adjusted in such a way that unwanted water enrichment is prevented in the subsequent acid gas removal unit.

The inventive embodiment of a contrivance for the treatment of an acid gas-containing hydrocarbon stream is detailed in a drawing, the inventive contrivance and the related process not being limited to this embodiment.

An industrial gas or natural gas (2) to be freed from acid gases and water is fed to a first absorption column (1). This gas flows upwards in the column, water and part of the acid gases being removed. The essentially water-free natural gas (3) is withdrawn at the head of the column (1a). A solvent (4) laden with water and acid gases is obtained at the column bottom. This solvent is fed to the head of a regeneration column (6) via a heat exchanger (5). There, it is freed from water and entrained acid gases with the aid of the acid gas stream fed to the bottom (6a), the said stream being routed in counter-current to the solution fed at the head. The head gas stream (7) discharged at the head of the regeneration column (6) is cooled by means of a cooler (8), part of the cooled, water-containing condensate is returned (8a) and part of it withdrawn (8b) and the residual water is condensed (9) in a condenser and withdrawn (9a). The pressure of the acid gas stream obtained is reduced to the lowest pressure level of the acid gas removal unit, in this configuration to the pressure of the last flash vessel (17c), and compressed together with the flash gas from this flash vessel (17c) in a first compressor stage (10) and withdrawn downstream of a second compressor stage (11) for final use as acid gas (11a). The water-free solvent is returned to the first absorption column (1) after heat exchange with water-laden solution (4) in the heat exchanger (5) via a recycle pump for gas drying (12) and a cooler (13).

The essentially water-free natural gas (3) which is withdrawn at the head (1a) of the first absorption column (1) and to be freed from acid gas components is fed to a second absorption column (14). There, the essentially water-free natural gas (3) is freed from acid gases such that a dried product gas freed from acid gases (15) is obtained at the head of the absorption column (14a). A solvent laden with acid gases (16) is obtained at the bottom of the second absorption column (14b). This solvent is flashed in a flash vessel (17a), co-absorbed valuable gas is discharged and returned to the second absorption column (14) by means of a compressor (19). The heat exchanger or cooler (18) dissipates the compression heat from the recycle gas. A part-stream of the acid gas (23) flashed during further pressure reduction in a flash vessel (17b) is returned to the bottom of the reboiler (24) of the regeneration column (6). The solvent is flashed in a further flash vessel (17c), acid gases being obtained at a low pressure level compressed to the pressure of the flash vessel (17b) by means of a first compressor stage (10). The regenerated solvent is returned to the second absorption column (14) provided for the absorption of acid gases by means of the solvent recycle pump (21).

LIST OF REFERENCES USED

1 First absorption column
1a Head of the first absorption column
2 Natural gas to be purified
3 Essentially water-free natural gas
4 Solvent laden with water and acid gases
5 Heat exchanger
6 Regeneration column (solvent regeneration unit)
6a Bottom of the regeneration column
7 Head gas stream of the regeneration column
8 Cooler or condenser
8a Returned, cooled, water-containing condensate
8b Withdrawn condensate
9 Cooler or condenser
9a Withdrawn water
10 First compressor stage
11 Second compressor stage
11a Withdrawn acid gas
12 Recycle pump for gas drying
13 Heat exchanger or cooler
14 Second absorption column (acid gas removal unit)
14a Head of the second absorption column
14b Bottom of the second absorption column
15 Dried product gas freed from acid gases
16 Solvent laden with acid gases and valuable components 17a,17b,17c Flash vessel (acid gas solvent regeneration unit)
18 Heat exchanger or cooler
19 Compressor
20 Acid gas from flash vessel
21 Solvent recycle pump
22 Regenerated solvent
23 Acid gas stream
24 Reboiler

The invention claimed is:

1. A process for the removal of water or water vapour from industrial gases by absorption using a physical solvent, wherein the industrial gas contains vaporous water and acid gas components, the process comprising:
    contacting the industrial gas to be dried and containing acid gas components and water with the physical solvent in a gas drying step, yielding an industrial gas almost free of water and containing acid gas components, and a water-containing solvent stream;
    directing the water-containing solvent stream to a solvent regeneration unit, yielding a solvent of reduced water content, which is then returned for absorption of water from the industrial gas by contacting the solvent of reduced water content with the industrial gas;
    conveying the industrial gas stream almost free of water to a downstream acid gas removal unit and removing acid gases by contacting the industrial gas almost free of water with the same solvent employed in the gas drying step for the removal of the acid gases, obtaining an industrial gas almost free of acid gas components and an acid gas-containing solvent;
    conveying the acid gas-containing solvent to an acid gas solvent regeneration unit and obtaining a regenerated solvent stream and an acid gas stream removed from the acid gas-containing solvent,
    wherein
    the acid gas stream obtained in the acid gas solvent regeneration unit is divided into two part-streams, a first acid gas part-stream being passed to further use outside the process or disposed of, and
    a second acid gas part-stream being fed to the solvent regeneration unit, removing water contained in the water-containing solvent with the aid of this second acid gas part-stream, the removed water leaving the solvent regeneration unit as water vapour together with acid gas.

2. The process of claim 1, wherein the second acid gas part-stream is conveyed to a reboiler of the solvent regeneration unit.

3. The process of claim 1, wherein the second acid gas part-stream from the acid gas solvent regeneration unit is conveyed to the bottom of the solvent regeneration unit, the acid gas is fed to the bottom of the solvent regeneration unit, removing water contained in the solvent which flows counter-current to the flow of the second acid gas part-stream, and wherein the removed water leaves the head of the solvent regeneration unit as water vapour together with acid gas.

4. The process of claim 1, wherein the second acid gas part-stream is fed to the bottom of a reboiler of the solvent regeneration unit, the acid gas fed to the reboiler bottom removing water from the water-containing solvent, the removed water being fed to the bottom of the solvent regeneration unit as water vapour together with the acid gas, and there also removing water from the solvent stream flowing counter-current to the water vapour together with the acid gas.

5. The process of claim 1, wherein the acid gas components comprise hydrogen sulphide ($H_2S$), carbon dioxide ($CO_2$), carbon oxide sulphide (COS), mercaptans, or a mixture thereof.

6. The process of claim 1, wherein the acid gas leaving the head of the solvent regeneration unit is cooled, a cooled condensate is obtained, and the cooled condensate is returned to the head of the solvent regeneration unit.

7. The process of claim 1, wherein the acid gas leaving the head of the solvent regeneration unit is cooled in a first condensation wherein a cooled condensate is obtained, and part of the cooled condensate is discharged.

8. The process of claim 7, wherein the acid gas leaving the head of the solvent regeneration unit is further cooled after the first condensation such that residual water vapour is condensed to form condensed water, and the condensed water thus obtained is discharged.

9. The process of claim 8, wherein the acid gas stream leaving the solvent regeneration unit is combined with the acid gas stream from the acid gas solvent regeneration unit after removal of condensed water.

10. The process of claim 1, wherein the physical solvent for the removal of water in the solvent regeneration unit is adjusted to a temperature of 50 to 180° C. by preheating or by a reboiler, and the solvent regeneration unit is operated at a pressure of 0 to 10 bar.

11. The process of claim 1, wherein the physical solvent for the removal of water in the solvent regeneration unit is adjusted to a temperature of 100 to 140° C. by preheating or by a reboiler, and the solvent regeneration unit is operated at a pressure of 0.5 to 5 bar.

12. The process of claim 1, wherein the solvent which leaves the solvent regeneration unit and is almost free of water is cooled with the aid of a cooler or heat exchanger prior to being brought into contact again with the gas to be purified.

13. The process of claim 1, wherein the acid gas stream leaving the solvent regeneration unit is combined with a further acid gas stream from the acid gas solvent regeneration unit, the pressure of the acid gas stream from the solvent regeneration unit being set to a slightly higher value than the pressure of the further acid gas stream.

14. The process of claim 1, wherein the physical solvent for the removal of water is N-formyl morpholine or mixtures of N-formyl morpholine with morpholine derivatives.

15. The process of claim 1, wherein the physical solvent for the removal of water is propylene carbonate.

16. The process of claim 1, wherein the physical solvent for the removal of water comprises alkylated polyalkylene glycols.

17. An apparatus for the removal of water or water vapour from industrial gases containing acid gases by absorption using a physical solvent by the process of claim 1, comprising:
    at least one absorption column for industrial gas drying,
    at least one solvent regeneration unit for water-containing solvent leaving the absorption column for industrial gas drying,
    at least one more absorption column for removing acid gas from the dried and acid gas-containing industrial gas,
    at least one acid gas solvent regeneration unit,
    wherein in the apparatus, a solvent bottom stream of the absorption column for industrial gas drying is routed to the head of the solvent regeneration unit, and
    a solvent bottom stream of the solvent regeneration unit is routed back to the absorption column for industrial gas drying, after removal of water, and
    dried gas is fed to the further absorption column for acid gas removal, which removes a major part of the acid gas components contained in the gas fed to the further absorption column from the absorption column for gas drying by means of a regenerated solvent stream, the solvent leaving the bottom of the further absorption column and laden with acid gases is fed to an acid gas solvent regeneration unit, and a part-stream of acid gas recovered in the acid gas solvent regeneration unit is routed to the bottom of the solvent regeneration unit or to the bottom of a reboiler for the solvent regeneration unit, and a head gas stream of the solvent regeneration unit is mixed with an acid gas stream from the acid gas solvent regeneration unit or is discharged.

18. The apparatus of claim 17, wherein the solvent regeneration unit is a column.

19. The apparatus of claim 17 wherein the acid gas solvent regeneration unit consists of one or more flash vessels.

20. The apparatus of claim 17, wherein a compressor is located in a connecting line between the second acid gas stream from the acid gas solvent regeneration unit and a bottom inlet to the solvent regeneration unit.

* * * * *